US006922136B2

(12) United States Patent
Komada et al.

(10) Patent No.: US 6,922,136 B2
(45) Date of Patent: Jul. 26, 2005

(54) SECURITY METHOD FOR VEHICLE SAFE DRIVING SUPPORT SYSTEM

(75) Inventors: Makio Komada, Kyoto (JP); Makoto Ishizaka, Kawasaki (JP); Masateru Suzuki, Yokohama (JP); Ryoichi Kurata, Tokyo (JP); Masato Maeda, Tokyo (JP)

(73) Assignee: National Institute for Land and Infrastructure Management, Ministry of Land, Infrastructure and Transport, Tsukuba (JP)

( * ) Notice: Subject to any disclaimer, the term of this patent is extended or adjusted under 35 U.S.C. 154(b) by 95 days.

(21) Appl. No.: 10/375,405

(22) Filed: Feb. 27, 2003

(65) Prior Publication Data

US 2004/0145495 A1 Jul. 29, 2004

(30) Foreign Application Priority Data

Jan. 27, 2003 (JP) .................................... 2003-017739

(51) Int. Cl.[7] .................................... B60Q 1/00
(52) U.S. Cl. .................... 340/425.5; 340/436; 340/905
(58) Field of Search .............................. 340/931, 907, 340/435, 436, 425.5, 437, 468, 471, 908, 903, 905; 40/612; 315/129, 132, 133, 136

(56) References Cited

U.S. PATENT DOCUMENTS

| | | | | | |
|---|---|---|---|---|---|
| 3,863,214 A | * | 1/1975 | Kerr, Jr. | ................. | 340/932.1 |
| 5,729,214 A | * | 3/1998 | Moore | ......................... | 340/905 |
| 5,892,461 A | * | 4/1999 | Dokko | ....................... | 340/907 |
| 6,317,058 B1 | | 11/2001 | Lemelson et al. | .......... | 340/910 |
| 6,317,682 B1 | * | 11/2001 | Ogura et al. | ................ | 701/117 |
| 6,559,774 B2 | * | 5/2003 | Bergan et al. | .............. | 340/908 |
| 6,720,883 B2 | * | 4/2004 | Kuhr et al. | ................. | 340/642 |

FOREIGN PATENT DOCUMENTS

| | | |
|---|---|---|
| FR | 2 406 860 | 5/1979 |
| FR | 2 562 694 | 10/1985 |
| GB | 1 123 354 | 8/1968 |
| WO | WO 95/31798 | 11/1995 |

* cited by examiner

*Primary Examiner*—Toan N. Pham
(74) *Attorney, Agent, or Firm*—Flynn, Thiels, Boutell & Tanis, P.C.

(57) ABSTRACT

A security method for a vehicle safe driving system provides drivers information for safe driving, that is, when a sensor does not detect any danger when there is a danger on the road, when there are some limits in the system operations, or when a portion of the system does not work.

3 Claims, 3 Drawing Sheets

FIG. 3

(SAFETY ANALYSIS IN VARIOUS STATES OF A DRIVING SUPPORT SYSTEM)

| | | | | | | | | | | |
|---|---|---|---|---|---|---|---|---|---|---|
| | TIME WHEN THE SERVICE IS TO BE PROVIDED (TRAFFIC IS AVAILABLE FOR VEHICLES) | | | | | | TIME WHEN THE SERVICE IS NOT REQUIRED (TRAFFIC INHIBITED) | | | |
| | TIME WHEN THE SERVICE IS PROVIDED (NORMAL SERVICE TIME) | | TIME WHEN THE SERVICE IS STOPPED BY THE DETERMINATION OF THE SYSTEM ITSELF | TIME WHEN THE SYSTEM DOES NOT WORK: FAILURE IN WHICH INFORMATION OF THE FAILURE IS DELIVERED TO VEHICLES | TIME WHEN THE SYSTEM DOES NOT WORK: FAILURE IN WHICH INFORMATION OF THE FAILURE IS NOT DELIVERED TO VEHICLES | TIME FOR MAINTENANCE | TIME OF OPERATION STOPPED | | | |
| SYSTEM OPERATIONS / ACTUAL EVENT | INFORMATION THAT THERE IS A DANGER IS DELIVERED TO VEHICLES | INFORMATION THAT THERE IS NO DANGER IS DELIVERED TO VEHICLES | INFORMATION THAT THE SERVICE HAS BEEN STOPPED IS DELIVERED TO VEHICLES | INFORMATION THAT THE SYSTEM DOES NOT WORK IS DELIVERED TO VEHICLES | INFORMATION THAT THE SYSTEM DOES NOT WORK CAN NOT BE DELIVERED TO VEHICLES | SYSTEM OPERATION IS STOPPED | SYSTEM OPERATION IS STOPPED | INFORMATION IS NOT ACCURATELY DELIVERED WITHIN A PRESPECIFIED PERIOD OF TIME | INFORMATION IS NOT ACCURATELY DELIVERED TO DRIVERS BECAUSE THE ON-BOARD EQUIPMENT DOES NOT WORK OR DUE TO A FAILURE OF HMI | A DRIVER MISUNDERSTANDS, MISSES, IGNORES, OR PUTS EXCESSIVE CREDIBILITY ON INFORMATION |
| NOT DANGEROUS SITUATION | a △ INCLUDE SAFE FAILURE | c ○ | e ○ | g ○ | i △ | k ○ | — | m △ | o △ | q △ |
| DANGEROUS SITUATION | b ○ | d × | f ○ | h ○ | j × | l ○ | — | n × | p × | r × |
| | INFRASTRUCTURE | | | | | | | RADIO WAVE PROPAGATION PATH | VEHICLE | DRIVER |

○: THE INFORMATION OF ACTUAL EVENT IS ACCURATELY PROVIDED TO DRIVERS, OR THE INFORMATION IS INDICATING THE INPOSSIBILITY FOR THE SYSTEM NOT TO DELIVER ACCURATE INFORMATION TO DRIVERS.

△: THERE IS NO ACTUAL DANGEROUS EVENT, BUT THE SITUATION IS NOT PROVIDED TO DRIVERS ACCURATELY.

×: WHEN THERE IS AN ACTUAL DANGEROUS EVENT, INFORMATION OF "NO DANGER" IS GIVEN TO DRIVERS, OR INFORMATION THAT THE SYSTEM DOES NOT OPERATE IS NOT GIVEN TO DRIVERS.

FIG. 4

EXPERIMENTAL CONDITIONS :

a) THERE IS A STATIONARY VEHICLE (OR MAY BE NO STATIONARY VEHICLE) AT A SITE ON A CURVE ROAD WITH 250 R. THE VEHICLE IS VISIBLE TO DRIVERS AT A PLACE OF 80 METERS OR MORE AFAR FROM THE SITE.
b) THE VEHICLE RUNS AT THE SPEED OF 120 km/h IN THE STRAIGHT SECTION AND THE SPEED IS CONTROLLED BY THE DRIVER ALONG THE CURVE SECTION.
c) THE INFORMATION IS DISPLAYED BOTH IN THE VEHICLE AND ON THE ROADSIDE MESSAGE BOARD.
d) 20 PERSONS PARTICIPATED IN THIS EXPERIMENT.
e) INFORMATION
   (1) WHEN THERE IS A STATIONARY VEHICLE THE INFORMATION OF "STATIONARY VEHICLE" IS DISPLAYED.
   (2) WHEN THERE IS NOT A STATIONARY VEHICLE, THE INFORMATION OF "CURVE ROAD AHEAD" IS DISPLAYED.
   (3) AS THE FINAL TEST, THE INFORMATION OF "CURVE ROAD AHEAD" IS DISPLAYED ALTHOUGH THERE IS ACTUALLY A STATIONARY VEHICLE. (ERRONEOUS INFORMATION IN DANGEROUS STATE)
   (4) NO MESSAGE IS GIVEN.

RESULT OF THE EXPERIMENT

THE AVERAGE SPEEDS JUST BEFORE THE DRIVER FINDS THE STATIONARY VEHICLE WERE COMPARED TO EACH OTHER.

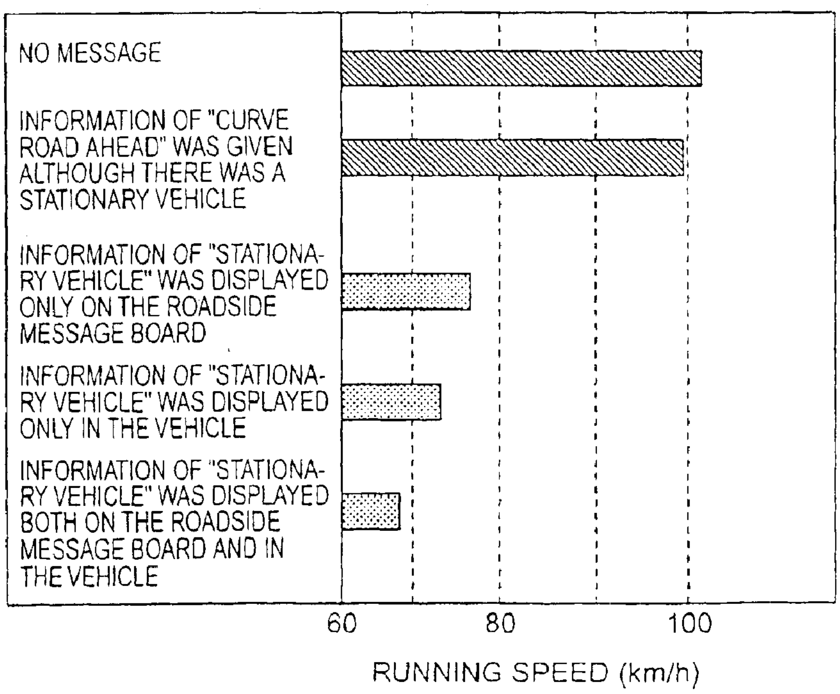

SECURITY METHOD FOR VEHICLE SAFE DRIVING SUPPORT SYSTEM

FIELD OF THE INVENTION

The present invention relates to a safe driving assist system for road vehicles by providing drivers information through cooperation between a roadside system and an in-vehicle system.

BACKGROUND OF THE INVENTION

The concepts, designing procedures and the like of security devices for defending humans from harm when a machine fails or humans make a mistake are described, for instance, in JIS B 9705-1: SAFETY OF MACHINES, Safety-Related Portions of Control System Part I: General Rules for Designing. In large-scale systems such as general industrial machines or nuclear facilities, security is provided, based on the recognition that humans make mistakes, to minimize intervention by humans. If intervention by humans is required by any means, expert persons, who have been fully trained, are allowed to operate the machines for security.

In contrast, in the automotive traffic system, although there is a licensing system, safety is generally secured based on observance of traffic rules and much attention of non-professional drivers. The method of securing the automotive traffic system generally has been traffic controls and education of the drivers.

Recently, to reduce careless mistakes of drivers, a sensor system has been loaded on a vehicle to alert the driver upon the detection of obstacles around the vehicle. It is becoming more and more popular, and further a safe driving support system has been developed which detects dangerous situations at places where traffic accidents frequently occur with sensors installed on the roadside and provides the driver with information concerning the dangerous situations.

The present invention relates to a safe driving support system which delivers information concerning dangerous situations from a system installed on a roadside to vehicles and drivers. With this type of system, if erroneous information indicating that there is no danger is delivered from the roadside system to a vehicle and a driver when there is a danger, and when the driver believes that the information is correct, the driver falls in a dangerous situation, which is problemsome. This invention was made for preventing occurrence of the problems as described above.

SUMMARY OF THE INVENTION

The present invention was made in light of the circumstances described above, and it is an object of the present invention to provide a system security method which is effective for security of the vehicle safe driving support system.

To achieve the object mentioned above, the system security method according to the present invention is characterized in that, in a system of safe driving assistance by delivering information from a roadside system to vehicles and drivers thereof, when a dangerous situation is not detected by a sensor when there is a danger on the road, or when the system work is limited, or when a part of the system fails to work, information on the impossibility of delivering accurate information concerning the road situation is delivered to the vehicles and drivers to make the drivers careful and drive safe.

The system security method according to this invention has the configuration as described above, so that it can effectively insure security of the safe driving support system.

BRIEF DESCRIPTION OF THE DRAWINGS

FIG. 3 is a table for safety analysis in each state of the system; and

FIG. 4 is a view illustrating an experiment with a driving simulator.

DETAILED DESCRIPTION OF THE INVENTION

One embodiment of the present invention is described in detail below with reference to the drawings.

Figure 1:
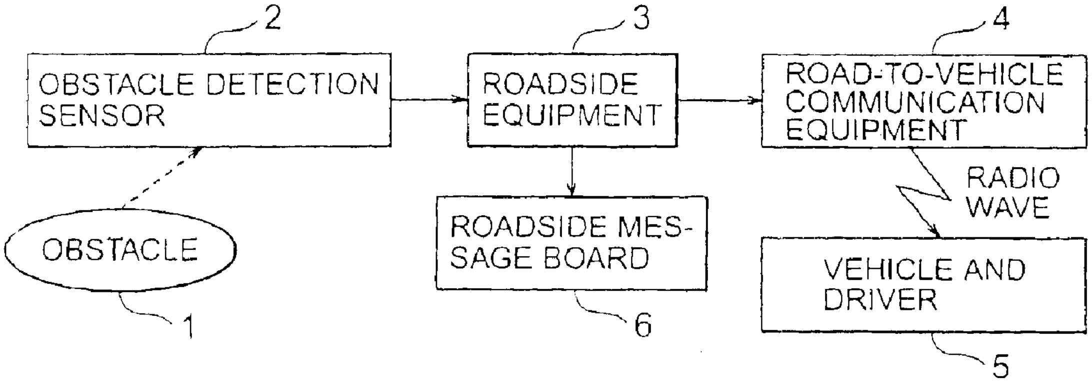
FIG. 1 is a system block diagram illustrating one embodiment of the present invention.
Figure 2:
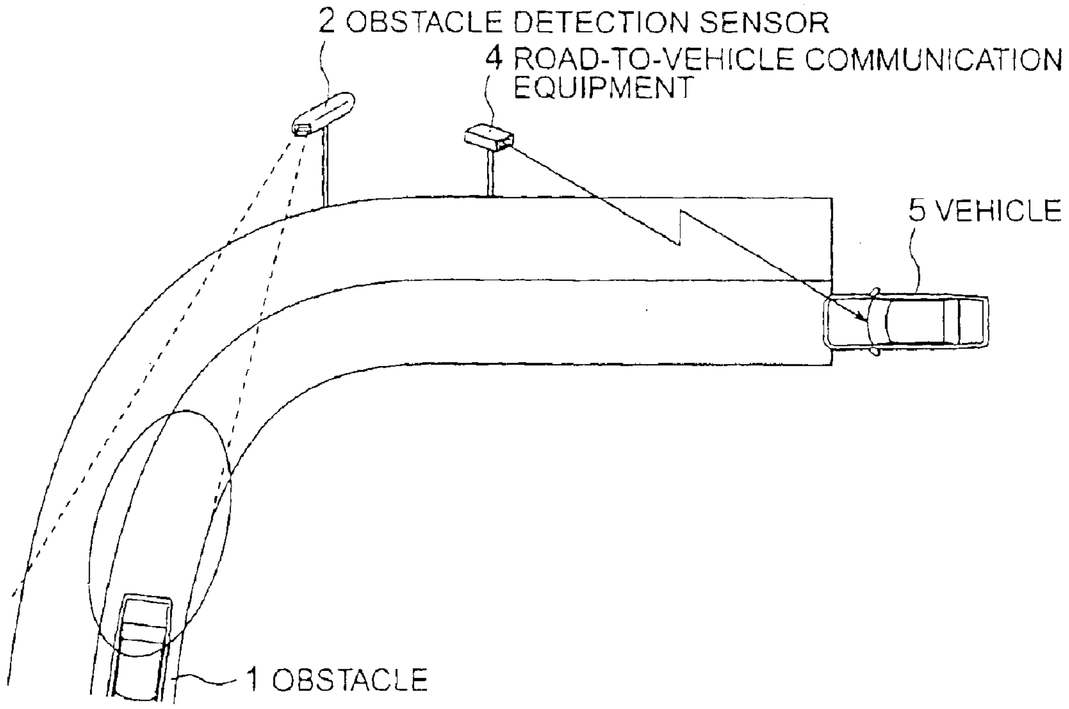
FIG. 2 is a view illustrating the state where the system has been installed.

The safe driving support system comprises, as shown in FIG. 1, a roadside system in turn comprising an obstacle detection sensor 2, roadside equipment 3, road-to-vehicle communication equipment 4, a roadside message board 6 and a system on a vehicle 5. This system is installed at a site hardly visible from drivers such as a curved road as shown in FIG. 2 where traffic accidents frequently occur.

This system operates as described below. At first, the obstacle detection sensor 2 detects an obstacle 1 on the road, and delivers the information concerning the position or size of the obstacle to the roadside equipment 3. The roadside equipment 3 delivers, based on the information from the sensor, information indicating that there is an obstacle on the road to the roadside message board 6, and further delivers the information via the road-to-vehicle communication equipment 4 to the vehicle 5. The vehicle system 5 presents the received information to the driver according to the running conditions of the vehicle or operating state of the driver and at the appropriate timing. Thus, the driver can know the situation before the vehicle arrives at the site where the obstacle exists and can evade the obstacle in good time.

If the obstacle detection sensor 2 does not detect the obstacle 1 when the obstacle 1 is on the road, the obstacle detection sensor 2 sends the information of "No obstacle" to the roadside equipment 3. If the roadside equipment 3 shows a message of "No obstacle" or no message on the roadside message board 6, drivers might recognize that there is no obstacle on the road and might pay little attention to the road traffic conditions. Also, when the information of "No obstacle" is sent via the road-to-vehicle equipment 4 and the vehicle gives the information of "No obstacle" or gives no information to the driver, the driver might also pay little attention to the road traffic conditions based on the recognition that there is no obstacle on the road.

A table showing a result of analysis of the cases in which the safe driving support system may cause trouble in the dangerous state as described above in various operating situations is shown in FIG. 3. In FIG. 3, the troubles in the dangerous state is indicated by X. The section with the sign d indicates the trouble that the sensor 2 cannot detect the events in the dangerous state. The section with the sign j indicates the trouble that the machine does not work properly and the state is not recognized by drivers. The section with the sign n indicates the trouble that radio waves transmitted from the road-to-vehicle communication equipment 4 do not arrive at the vehicles because of blockage or interference due to multiple reflection. The section with the sign p indicates the trouble that the device on the vehicle 5 does not operate properly and no information is given to the driver. The section with the sign r indicates the trouble that the driver does not recognize or ignores the information. Reducing the troubles as shown in the table is important, but it is practically and theoretically impossible to eliminate all of the troubles.

An object of the present invention is to provide a method of securing system safety even though any of the troubles as described above occurs. As described above, security of the road traffic system is kept by drivers' attention. This invention is concerned with alerting drivers for securing safety of the road traffic system.

In each of the states shown in FIG. 3, the sign a indicates a situation where erroneous information is given, but the information is in the safe state. The signs b and c indicate correct information. The signs e to h, k, and l indicate the state that the given information may be correct and may not accurately reflect the road situations. In these states, information advising the drivers for safe driving is given to the drivers. The signs i, j, m, and n indicate the situation where no information is given and the vehicles cannot be provided proper services. For these cases, no message is given. With the three types of state messages, a driver determines that, at least the same message must be given if the system works properly and any message is not given because the system is not working properly. In this case, the driver carefully drives the vehicle. The signs o and p indicate the state that the device on the vehicle 5 does not operate properly and the driver can carefully drive the vehicle, as in the case when no message is given. Education of drivers would be useful for the situations indicated by the signs q and r.

The information required to advise drivers for safe driving may be considered to be a message reflecting the features of a site where the system is installed. In the experiment with a driving simulator, the information of "Curved road ahead" as shown in FIG. 4 was given as notice information for safe driving. Regarding the result of this experiment, providing information is better than no message for driver's safety even if a dangerous situation exists. By improving the way of presenting the information, the system safety would be maintained more than in the case of no message.

What is claimed is:

1. A method of delivering information from a roadside system to a driver in a vehicle traveling along a road comprising the steps of:

providing a roadside system comprising a road situation detection sensor for detecting a situation on the road, roadside equipment for delivering information regarding the situation detected by the road situation detection sensor to a roadside message board and road-to-vehicle communication equipment, a roadside message board for displaying information regarding the situation and road-to-vehicle communication equipment for delivering information regarding the situation to the driver in the vehicle;

determining whether the roadside system is functioning properly, a dangerous situation on the road is detected by the roadside system, a dangerous situation on the road is not detected by the roadside system or the roadside system is malfunctioning in another manner; and relaying information to the driver in the vehicle as to how the roadside system is functioning.

2. The method of claim 1, wherein the driver in the vehicle is given information as to whether a dangerous situation exists, there is a possibility of a dangerous situation or the system cannot provide accurate information.

3. The method of claim 1, wherein the driver in the vehicle is provided with information regarding a specific dangerous situation at a site where the roadside system is installed.

* * * * *